United States Patent [19]

Hessenmüller

[11] Patent Number: 4,611,323
[45] Date of Patent: Sep. 9, 1986

[54] METHOD FOR TRANSMITTING DIGITALLY CODED ANALOG SIGNALS

[75] Inventor: Horst Hessenmüller, Rossdorf, Fed. Rep. of Germany

[73] Assignees: ANT Nachrichtentechnik GmbH, Backnang; Philips Kommunikations Industrie AG, Nuremberg; Siemens Aktiengesellschaft, Berlin and Munich, all of Fed. Rep. of Germany

[21] Appl. No.: 613,381

[22] Filed: May 23, 1984

[30] Foreign Application Priority Data

May 24, 1983 [DE] Fed. Rep. of Germany ....... 3318774

[51] Int. Cl.$^4$ ............................. H04J 3/16; H04J 6/00
[52] U.S. Cl. ........................................ 370/79; 370/94
[58] Field of Search ............... 370/118, 79, 82, 83, 370/94, 60; 358/261

[56] References Cited

U.S. PATENT DOCUMENTS

| 3,708,625 | 1/1973 | Angeleri et al. | 370/79 |
| 3,891,804 | 6/1975 | Hachenburg | 370/79 |
| 4,100,377 | 7/1978 | Flanagan | 370/94 |
| 4,251,880 | 2/1981 | Baugh et al. | 370/79 |
| 4,276,544 | 6/1981 | Iinuma | 358/261 |
| 4,398,290 | 8/1983 | Mathieu et al. | 370/94 |

OTHER PUBLICATIONS

"NICAM 3: Near-Instantaneously Companded Digital Transmission System for High-Quality Sound Programmes," Caine et al, The Radio and Electronic Engineer, vol. 50, No. 10, pp. 519–530 Oct. 1980.
CCIR Greenbook, vol. X/XI, Part 2, p. 265, 1982.

Primary Examiner—Douglas W. Olms
Assistant Examiner—Frank M. Scutch, III
Attorney, Agent, or Firm—Hill, Van Santen, Steadman & Simpson

[57] ABSTRACT

A method for transmitting digitally coded analog signals which are combined in coding blocks in a digital packet multiplex system permits transmission of coding blocks having a length which does not correspond to the normal useful packet length. In such an instance, packets having a different content are generated and information identifying such packets is transmitted to the receive side of the system in the form of a designated number of bits in the existing available transmission capacity of the beginning of the packet, so that the beginnings of the coding block can be recognized at the receive side.

6 Claims, 2 Drawing Figures

METHOD FOR TRANSMITTING DIGITALLY CODED ANALOG SIGNALS

BACKGROUND OF THE INVENTION

1. Field of the Invention

The present invention relates to a method for transmitting digitally coded analog signals which are combined in a coding block in a digital packet multiplex system in the form of equally long packets each having a beginning portion of specified length and a following useful portion for transmitting information-containing bits.

2. Description of the Prior Art

Digital transmission methods employing packets of equal length wherein the packet has a beginning identifying portion followed by a portion containing useful information to be transmitted will be employed in the digital transmission of high quality audio signals via broadcast satellites. As a result of the great flexibility afforded by such methods, packet multiplex methods enable accommodation of the greatest variety of digital signals in uniformly constructed data packets or blocks.

A method is known wherein a near-instantaneous compander is used during the digital coding of analog signals so that a number of uniformally stepped quantization scales or whose quantization differs by the factor of two can be utilized instead of the irregularly stepped quantization scale in the case of an instantaneous compander. In coding devices for high quality audio signals employing near instantaneous companding, a specific number of samples such as, for example 32, is first uniformally quantized and coded with the smallest of the provided resolutions. The resulting code words are digitally stored. The "fine" quantization is then either retained or converted to a "coarse" quantization as a function of the most significant of the stored code words and as a function of the number of bits per word which has been selected for transmission.

For example, if uniform quantization and 14 bit coding are executed in a first step, 4 bits of the 14 bits are, for example, after identification of the most significant code word, suppressed depending upon the significance of the most significant code word. A necessary condition for undertaking this method is that a scaling factor word consisting of a of bits to be additionally transmitted is attached to each of the blocks consisting of 32 code words, the scaling factor word providing information regarding the selected quantization scale. Clock synchronization between the transmit and receive sides of the system must also be present.

A system proposed the so-called NICAM 3 of the British Broadcasting Corporation (The Radio And Electronic Engineer, Volume 50, 1980, No. 10 at pages 519–530) employs a quantization characteristic with $s=1024$ intervals, $n=10$ bits per sample, and 32 samples per block. The European Broadcasting Union has proposed this method to the CCIR for application in broadcast satellite service.

Given the above described coding method, it is necessary that a block identifier be communicated to the receive side decoder, the block identifier indicating the beginning of the coding blocks.

It is also known to co-transmit one bit for reducing the influence of bit errors arising on the transmission link in addition to each coded sample. A parity check of, for example, the five most significant bits is executed with this bit. When a parity error as a consequence of a bit error in the protective bits of a code word is identified at the receive side, the faulty code word is suppressed and is replaced by an estimated value which can be acquired, for example, by linear interpolation between the code words which are chronologically immediately before and after the faulty code word. Mean bit error rates of up to approximately $10^{-5}$ may be tolerated by means of this simple protection against bit errors which, related to the above described coding example, increases the number of bits per sample to 11. Given more unfavorable bit error rates of, for example, $10^{-3}$ which may occur at the fringe or outside of a particular service region in the case of satellite broadcasting using digital audio transmission, it is necessary to provide substantially more additional transmission capacity for bit error protection, and to employ error-protecting codes, such as BCH code, HAMMING code, etc.

It is further known that continuous multiplexing with fixed time division of the pulse frame or time division of the pulse frame which is variable within strict limits or packet multiplexing may be employed for digital multiplex formation of a plurality of channels.

In the last instance, the useful information is accommodated in packets having a fundamental format as shown in FIG. 1. Each packet has a length w which is subdivided into segments x, y and z. A synchronization combination which is identical for all packets is contained in the segment x. The segment y contains address information which is different depending upon the channel or the type of service. The portion of the packet occupied by the segments $x+y$ is also referred to as the head of the packet. The useful data is contained in the portion z of the packet. Because re-synchronization (by means of the x segment) is undertaken for every packet of a packet multiplex, both the length of the packets and the point in time of their arrival can be arbitrary. It has been shown that the transmission bit rate can only be occupied up to 90 to 95 percent by the useful data to the necessity of transmitting the packet head.

The transmission bit rate, however, can be more efficiently used when packet multiplexing is modified in a manner as described in the CCIR Green Book, Volumes X and XI Part II, Geneva, 1982, page 265. Only one uniform packet length is employed in this method. The packets appear in periodic succession, i.e., one packet immediately follows the preceding packet. The capacity required for synchronization purposes can be considerably reduced by this method because a special error protection for the periodically occurring synchronization combination need not be utilized. The synchronization means which is standard for continuous multiplexing can be utilized.

This modified packet multiplex, however, has the disadvantage that the coding blocks with 32 coded samples contain a different number of bits in the transmission of digitally coded audio signals having different outlay for the bit error protection, each sample containing, for example, 11 or 15 bits. Because it was previously assumed that the boundaries of the coding blocks should be simultaneously transmitted by means of the packet information, it was necessary to provide a complete series of coding blocks per packet. This unavoidably results in differing packet lengths given different error protection methods. Different demultiplexers are therefore necessary. A mixed transmission of signals having different error bit protection means, moreover, is not possible in the method described for modified packet multiplex in the CCIR Green Book.

SUMMARY OF THE INVENTION

It is an object of the present invention to provide a method for transmitting digitally coded analog signals in the format of a uniform packet length having a uniform useful portion length which also permits transmission of coding blocks having a length deviating from the normal useful portion length in the packets and which provides unambiguous recognition of the boundaries of the coding blocks at the receive side of the system.

As used herein, the term "useful portion" means the time slots within the digital signal in which message information is contained, in contrast to other portions (time slots) of the signal in which information relating to operation of the communications system is contained.

The above object is inventively achieved in a method wherein the useful portion of the packet is optimized with a first coding block length, which permits transmission of coding blocks having a second coding block length which is not the same as the optimized length of the first said coding block. This leads to a different structure of the useful portion of the packets. The presence of the different structure of the useful portion of the packet, i.e., the presence of useful subportions having a different length, is communicated to the receive side with a selected plurality of bits available in the free transmission capacity of the packet head.

DESCRIPTION OF THE PREFERRED EMBODIMENTS

Figure 1:
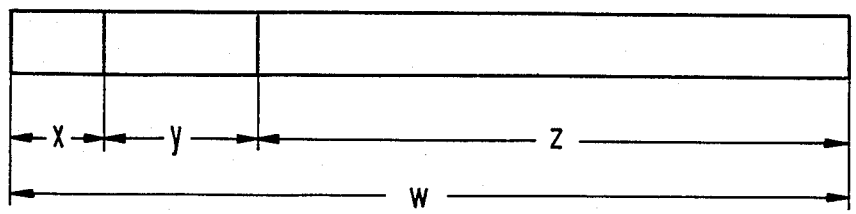
FIG. 1 is a schematic illustration of a packet format of the type employed in the method operating in accordance with the principles of the present invention.

The method disclosed and claimed herein employs a packet of the type already described and shown in FIG. 1. The packet has a total length w comprised of a synchronization segment x, an address information segment y, and a useful information segment z. The segments x and y for the head of the packet.

Figure 2:
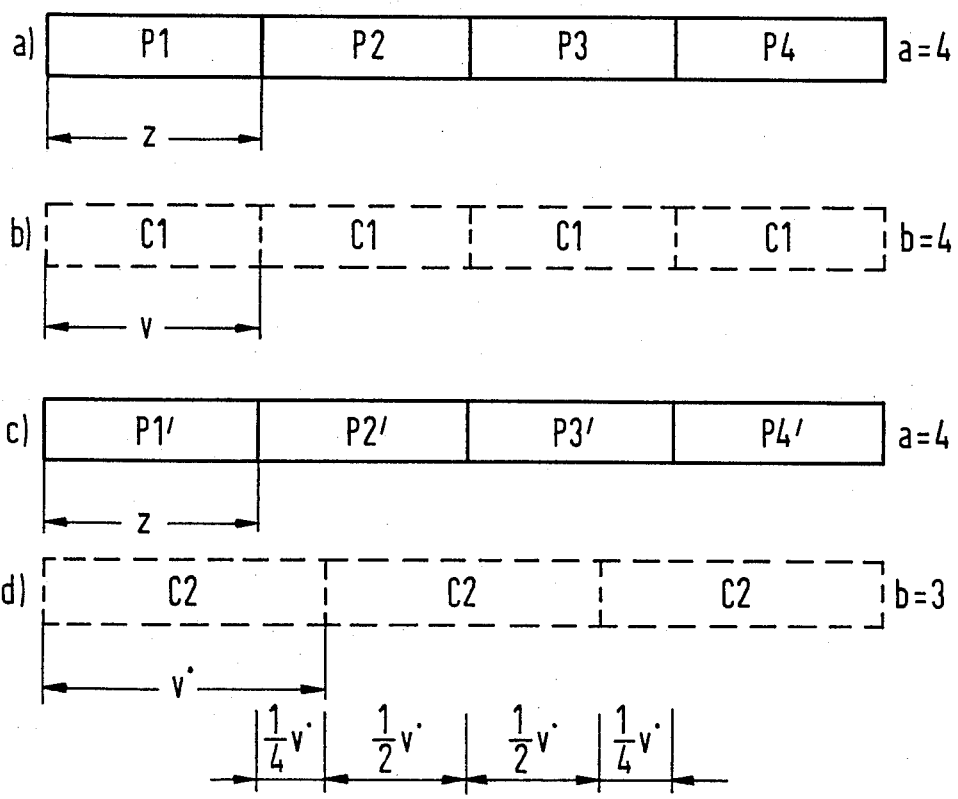
FIG. 2 is a schematic representation of the useful portion of packets illustrating the method operating in accordance with the invention disclosed and claimed herein.

The method disclosed and claimed herein is shown in the four diagrams of FIG. 2. FIG. 2a shows four useful segments P1, P2, P3 and P4, each of a length z, without a packet head. The length z is selected to be identical to a first coding block legnth v, shown in FIG. 2b associated with a first coding block C1. This coding block may, for example, be allocated to an audio signal having simple bit error protection achieved by transmitting a parity bit for every coded sample. Recognition of the boundaries of the coding blocks at the receive side is thus relatively easy.

If bit error protection is to be improved by adding additional protection bits per code word, a new coding block C2 is employed having a coding block length v' (as shown in FIG. 2d), which is different than the first coding block length v. The new coding block C2 is transmitted in useful segments P1', P2', P3', and P4' as shown in FIG. 2c. Comparison of FIGS. 2c and 2d shows that the chronological position of the boundaries of the coding blocks C2 differs from the boundaries of the packets P1' through P4'. Accordingly $a=4$ packets P1' through P4' which contain $b=3$ coding blocks C2 are employed. Each packet P1' through P4' contains one or more different length portions of the coding block C2. This condition is communicated to the receiver with $c=2$ bits by means of the free or extra available information capacity in the packet head. In general, the relationship between the number of packets a and the number of extra bits c is $a=2^c$.

The following numerical example illustrates the foregoing method. The number of bits per sample is 11 or 15 for two different bit error protection methods. A coding block C1 or C2 for a stereophonic audio signal contains $2 \cdot 32 = 64$ coded samples. The code block length v is therefore calculated as $v = (64 \cdot 11 \text{ bits}) + 16 \text{ bits} = 720$ bits. This is the length of the coding block C1. The 16 additional bits contained therein are availabe, for example, for transmitting the scaling information in order to maintain the factors a and b as small as possible. The first coding block length v is equal to the length z of the useful portions P1 through P4, i.e., 720 bits. A second coding block length $v' = 64 \cdot 15 \text{ bits} = 960$ bits derives for the coding block C2; thus the length $z = 3/4 v'$, the number of different packets P1' through P4' is 4 (i.e., $a=4$) and the number of additionally required bits is 2 (i.e., $c=2$).

If necessary, intermediate values of a in the above equation may be estimated by interpolation by selecting the next highest value of c. Additionally, at least one further bit may be added to the c bits for identifying the content structure of coding blocks having the first (i.e., optimum) coding block length, or further code word lengths as well.

Although modifications and changes may be suggested by those skilled in the art it is the intention of the inventor to embody within the patent warranted hereon all changes and modifications as reasonably and properly come within the scope of his contribution to the art.

I claim as my invention:

1. A method for inserting digitally coded analog signals which are combined in coding blocks into a digital packet multiplex system in the form of packets of equal length, each packet having a packet head and a useful portion having a length which is optimized to first coding block length, comprising the steps of:

for coding blocks having a coding block length different than said first coding block length of said useful portion of said packet, generating a different plurality of coding blocks of a different coding block length such that a plurality of new useful portions of said optimized length is obtained, said plurality of new useful portions having a different format from said packet portions; and communicating said different format of said new useful portions to said receiver with a plurality of bits available for transmission in the capacity of said packet head.

2. A method for transmitting digitally coded analog signals as claimed in claim 1 wherein the number of new useful portions of said coding block is a, and wherein said plurality of bits available in the transmission capacity of said packet head for communicating said format to said receiver is c, and wherein $a=2^c$.

3. A method for transmitting digitally coded analog signals as claimed in claim 2 wherein a next-highest value of c is selected for intermediate values of a in the equation $a=2^c$.

4. A method for transmitting digitally coded analog signals as claimed in claim 1 comprising the additional step of employing at least one additional bit in combination with said available bits in said transmission capacity of said packet head for identifying the content structure of coding blocks having said first coding block length.

5. A method for inserting a digitally coded analog signal into a time division multiplex signal, wherein each digitally coded analog signal consist of a series of coding blocks of predetermined fixed first data length and wherein said time division multiplex signal consist of a series of packets each including a packet head and a useful data portion of predetermined fixed second data length which is less than said first data length of said coding blocks, and wherein the overall data length of b coding blocks is equal to the data length of a data portions, a and b being integers, said method comprising the steps of:

partitioning successive groupings of b successive coding blocks into a modified coding blocks each having a length equal to said second data length;

generating a partitioning code for each modified coding block within each grouping; and inserting each modified coding block into a packet and inserting the associated partitioning code in the corresponding packet head.

6. A method as claimed in claim 5 wherein said partitioning code consist of c bits, and wherein $a=2^c$.

* * * * *